(12) United States Patent  
Cao

(10) Patent No.: US 9,778,523 B2  
(45) Date of Patent: Oct. 3, 2017

(54) ARRAY SUBSTRATE, LIQUID CRYSTAL DISPLAY PANEL AND LIQUID CRYSTAL DISPLAY DEVICE

(71) Applicant: Wuhan China Star Optoelectronics Technology Co., Ltd., Wuhan, Hubei (CN)

(72) Inventor: Shangcao Cao, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 0 days.

(21) Appl. No.: 15/075,151

(22) Filed: Apr. 5, 2016

(65) Prior Publication Data

US 2017/0212396 A1    Jul. 27, 2017

(30) Foreign Application Priority Data

Jan. 25, 2016 (CN) .................. 2016 1 00493830

(51) Int. Cl.
*G02F 1/136* (2006.01)
*G02F 1/1362* (2006.01)
*G02F 1/1333* (2006.01)
*G02F 1/1335* (2006.01)
*G02F 1/1343* (2006.01)
*G02F 1/1368* (2006.01)

(52) U.S. Cl.
CPC ...... *G02F 1/136213* (2013.01); *G02F 1/1368* (2013.01); *G02F 1/133345* (2013.01); *G02F 1/133514* (2013.01); *G02F 1/134309* (2013.01); *G02F 1/136286* (2013.01); *G02F 2001/133397* (2013.01); *G02F 2201/121* (2013.01); *G02F 2201/123* (2013.01)

(58) Field of Classification Search
None
See application file for complete search history.

(56) References Cited

U.S. PATENT DOCUMENTS

2008/0002074 A1*  1/2008 Lee ................... G02F 1/136213
                                                             349/38
2013/0300968 A1* 11/2013 Okajima ........... G02F 1/136209
                                                             349/43

* cited by examiner

*Primary Examiner* — Richard Kim
(74) *Attorney, Agent, or Firm* — Andrew C. Cheng

(57) ABSTRACT

An array substrate, a liquid crystal display panel and a liquid crystal display device of the present disclosure provided are designed to form a MIS storage capacitor by the polycrystalline semiconductor layer, the first metal layer and the insulating layer between the two or the polycrystalline semiconductor layer, the second metal layer and the insulating layer between the two. When one side of the first metal layer or the second metal layer is receiving the negative gray scale voltage, a P—Si in the polycrystalline semiconductor layer will gather to form a cavity, when receiving the positive gray scale voltage, a blocking layer will be formed on the P—Si to reduce the capacity of the MIS storage capacitor.

8 Claims, 5 Drawing Sheets

ARRAY SUBSTRATE, LIQUID CRYSTAL DISPLAY PANEL AND LIQUID CRYSTAL DISPLAY DEVICE

FIELD OF THE DISCLOSURE

The present disclosure relates to a liquid crystal display technology field, and more particularly to an array substrate, a liquid crystal display panel and a liquid crystal display device.

BACKGROUND OF THE DISCLOSURE

Flicker of LCD (Liquid Crystal Display) is generated by a variety of reasons, of which the most important reason is difference leakage of a TFT (Thin Film Transistor), because of the leakage of the TFT applying negative gray scale voltage is bigger than the leakage applying positive gray scale voltage, difference of a capacity is formed when the storage capacitor of the array substrate applying the positive and negative gray scale voltage. As the LCDs are now widely used in various fields, for reducing power consumption, the LCD is often applied a lower source drive voltage, so that the gray scale voltage difference between the adjacent gray scales is lower, the flicker generated is aggravating and affect the display.

SUMMARY OF THE DISCLOSURE

In view of this, the present disclosure provides an array substrate, a liquid crystal display panel and a liquid crystal display device to improve the flicker phenomenon and to ensure the display effect.

An array substrate of the present disclosure provided includes a substrate base material and a first metal layer, an insulating layer, a polycrystalline semiconductor layer and a second metal layer formed on the substrate base material, the first metal layer includes a spaced first zone and a spaced second zone, the first metal layer of the first zone is a gate electrode of a TFT of the array substrate, the second metal layer includes a spaced third zone and a spaced fourth zone, the second metal layer of the third zone and the fourth zone is a source electrode and a drain electrode of the TFT. Further, the polycrystalline semiconductor layer and the first metal layer of the second zone are insulating overlapped by the sandwiched insulating layer or the polycrystalline semiconductor layer and the second metal layer of the fourth zone are insulating overlapped by the sandwiched insulating layer to form a MIS storage capacitor of the array substrate.

Further, the gate electrode of the TFT is on the polycrystalline semiconductor layer, the array substrate further includes a light-shading metal layer formed on the substrate base material and a buffer layer arranged between the light-shading metal layer and the polycrystalline semiconductor layer, the light-shading metal layer is under the first zone.

Further, the array substrate further includes a dielectric isolation layer formed between the first metal layer and the second metal layer, the polycrystalline semiconductor layer is connected with a conductive metal layer of the array substrate, a first contact hole is formed by the dielectric isolation layer, the first metal layer of the second zone is connected with the second metal layer of the fourth zone by the first contact hole, thus the MIS storage capacitor is formed in the polycrystalline semiconductor layer, the first metal layer of the second zone and the insulating layer located between the two.

Further, the polycrystalline semiconductor layer is connected with the conductive metal layer of the array substrate, part of the second metal layer of the fourth zone is arranged on the insulating layer directly, thus the MIS storage capacitor is formed in the polycrystalline semiconductor layer, the second metal layer of the fourth zone and the insulating layer located between the two.

Further, the light-shading metal layer includes a spaced fifth zone and a spaced sixth zone, the fifth zone is under the first zone, the conductive metal layer of the array substrate includes the light-shading metal layer of the sixth zone, a second contact hole is formed by the buffer layer, the polycrystalline semiconductor layer is connected with the light-shading metal layer of the sixth zone by the second contact hole.

Further, the light-shading metal layer of the sixth zone is across an active area of the array substrate, the array substrate further includes a common electrode arranged on the substrate base material, the light-shading metal layer of the sixth zone is connected with the common electrode at periphery of the active area.

Further, the polycrystalline semiconductor layer includes a heavily doped polysilicon layer.

Further, process of the heavily doped includes the polycrystalline semiconductor layer heavily doped Be.

A liquid crystal display panel of the present disclosure provided includes the array substrate of above.

A liquid crystal display device of the present disclosure provided includes a liquid crystal display panel and a light source module providing light to the liquid crystal display panel, the liquid crystal display panel is the liquid crystal display panel of above.

The array substrate, the LCD panel and the LCD of the present disclosure are designed to form a MIS storage capacitor by the polycrystalline semiconductor layer, the first metal layer and the insulating layer between the two or the polycrystalline semiconductor layer, the second metal layer and the insulating layer between the two. When one side of the first metal layer or the second metal layer is receiving the negative gray scale voltage, a P—Si in the polycrystalline semiconductor layer will gather to form a cavity, when receiving the positive gray scale voltage, a blocking layer will be formed on the P—Si to reduce the capacity of the MIS storage capacitor. So as to improve the flicker phenomenon and ensure the display effect.

DETAILED DESCRIPTION OF PREFERRED EMBODIMENTS

Figure 1:
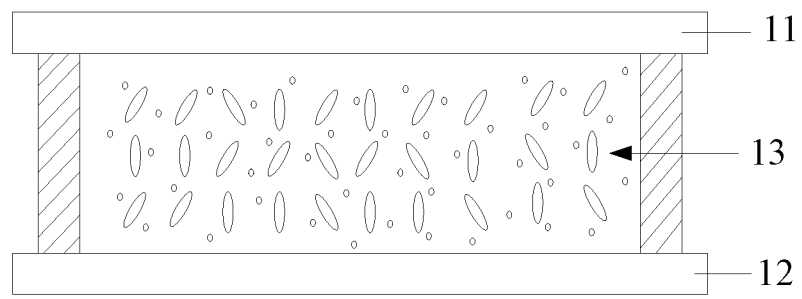
FIG. 1 is a cross-sectional view of the liquid crystal display panel structure of the present disclosure.

FIG. 1 is a cross-sectional view of the liquid crystal display panel structure of the present disclosure. As shown in FIG. 1, a liquid crystal display panel 10 of the present disclosure includes a CF substrate (Color Filter Substrate) 11 and a array substrate (also known as Thin Film Transistor Substrate) 12 spaced relatively and a liquid crystal (liquid crystal molecules) 13 filled between the CF substrate and the TFT substrate, the liquid crystal 13 is in the liquid crystal box superposition formed by the array substrate 12 and the CF substrate 11.

Figure 2:
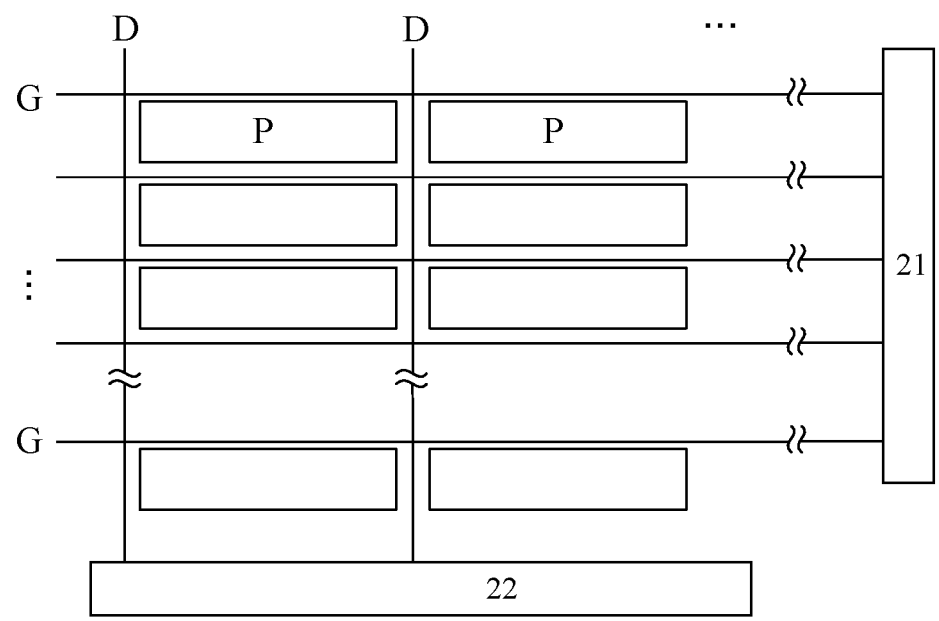
FIG. 2 is a cross-sectional view of the pixel structure of an embodiment of the liquid crystal display panel shown in FIG. 1.
Figure 3:
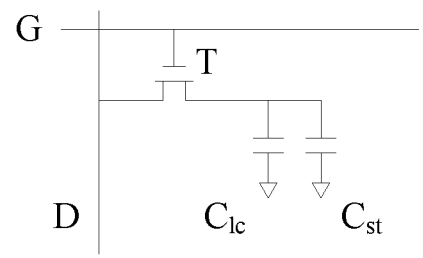
FIG. 3 is an equivalent circuit diagram of the pixel structure shown in FIG. 2.

Combined the schematic diagram of the pixel structure of the liquid crystal display panel 10 shown in FIG. 2, the array substrate 12 includes a plurality of data lines D arranged along the column direction, a plurality of scan lines G arranged along the row direction and a plurality of pixel zones P defined by the scan line G and the data line D. Each pixel zones P is connected with a corresponding data line D and a corresponding scan line G, and each scan lines G is connected with a gate driver 21 to provide a scan voltage to each pixel zones P, and each data lines D is connected with a source driver 22 to provide a gray scale voltage to each pixel zones P. Further combined the equivalent circuit diagram of the pixel structure shown in FIG. 3, the array substrate 12 includes a thin film transistor T, a storage capacitor $C_{st}$ and a liquid crystal capacitor $C_{lc}$, the liquid crystal capacitor $C_{lc}$ is formed by a pixel electrode in the pixel zone P, a common electrode of the liquid crystal display panel 10 and the liquid crystal 13 located between the two.

According to the display theory of liquid crystal display panel 10, when the scan line G inputting a scan voltage, a thin film transistor T at the same row is opened at same time, after a certain time, a thin film transistor T at the next row will be opened at same time, and so on. Because of each row of the open times of the thin film transistor T is shorter and the time of liquid crystal capacitor $C_{lc}$ controlling the deflection of liquid crystal 13 is shorter, is difficult to reach the response time of the liquid crystal 13. A storage capacitor $C_{st}$ can keeps the voltage of the pixel zone P after the thin film transistor T is closed, so as to provides a response time to the liquid crystal 13.

Figure 4:
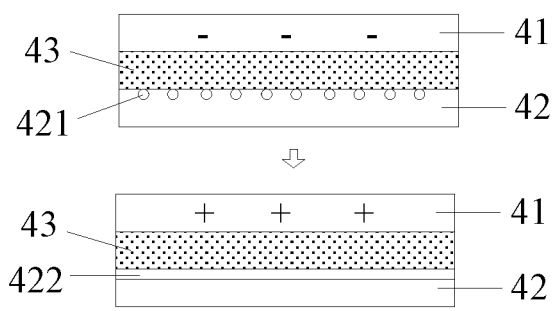
FIG. 4 is a cross-sectional view of the storage capacitor structure shown in FIG. 3.

The difference of the prior art is, the storage capacitor $C_{st}$ of the present disclosure embodiment is a MIS (Metal Insulator Semiconductor) storage capacitor, as shown in FIG. 4, the MIS storage capacitor $C_{st}$ is formed by the metal layer 41 and the polycrystalline silicon (P—Si) semiconductor layer 42 insulation overlapped by the insulating layer 43 between the two. Further, the polycrystalline semiconductor layer 42 corresponding to the MIS storage capacitor $C_{st}$ zone is a polycrystalline layer after process of the heavily doped, preferably, doped Be in the polycrystalline layer.

Figure 5:
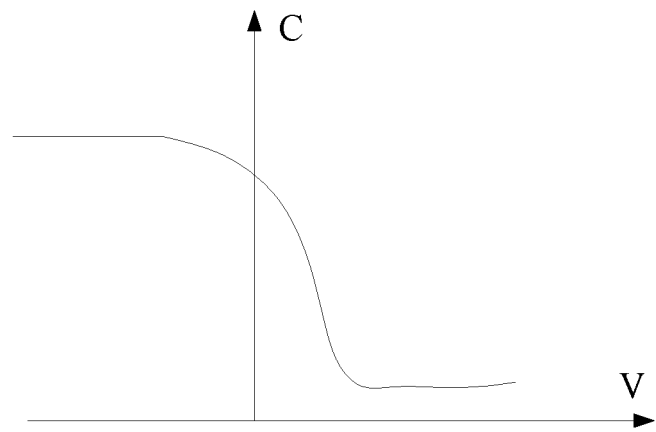
FIG. 5 is a CV graph of the storage capacitor shown in FIG. 3.

When one side of the metal layer 41 is receiving the negative gray scale voltage, a P—Si in the polycrystalline semiconductor layer 42 will gather to form a cavity 421, when the gray scale voltage of the metal layer 41 received is from positive to negative, the zone of the cavity 421 will be formed a blocking layer 422, i.e. a blocking layer 422 will be formed on the P—Si to reduce the capacity of the MIS storage capacitor. This means that, the MIS storage capacitor of the present embodiment is equivalent to a variable capacitor, further combined the CV (capacity—gray scale voltage) graph shown in FIG. 5, when the gray scale voltage is negative, the capacity of the MIS storage capacitor $C_{st}$ is $C_1$, when the gray scale voltage is positive, the capacity of the MIS storage capacitor $C_{st}$ is $C_2=C_1*C_0/(C_1+C_0)$, and $C_0$ is the capacity between the blocking layer 422 and the metal layer 41. As $C_1>C_2$ is known, the capacity of the MIS storage capacitor $C_{st}$ received negative gray scale voltage is higher than the capacity of the MIS storage capacitor $C_{st}$ received positive gray scale voltage. Base on leakage of the thin film transistor is higher when the gray scale voltage is negative, the present disclosure embodiment adds the capacity of the MIS storage capacitor $C_{st}$ to reduce the leakage of the thin film transistor T and improve the effect of the leakage of the TFT, i.e. reduces the difference of the capacity when the MIS storage capacitor $C_{st}$ receiving the positive and negative gray scale voltage to improve the flicker phenomenon and to ensure the display effect.

In the different design of the pixel structure, the metal layer 41 and the insulating layer 43 of the MIS storage capacitor $C_{st}$ are in particular to the different structure of the liquid crystal display panel 10. The present disclosure will now be combined with the FIGS. 6 to 10, the present disclosure will be apparent technical solution of the embodiment, a complete description.

Figure 6:
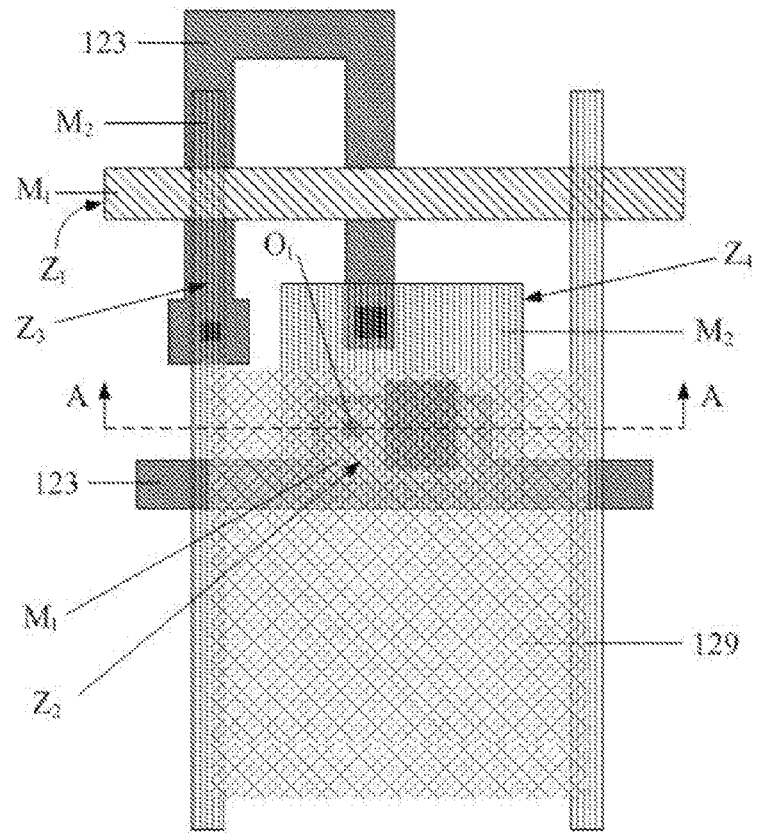
FIG. 6 is a schematic diagram of the pixel zone of the first embodiment of the present disclosure.
Figure 7:
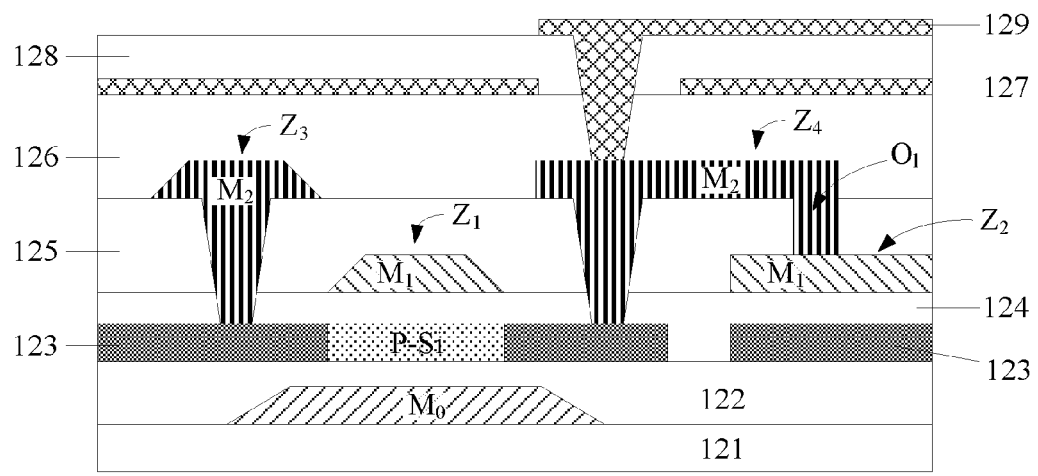
FIG. 7 is a cross-sectional view of the structure of the pixel zone along the line AA shown in FIG. 6.

FIG. 6 is a schematic diagram of the pixel zone of the first embodiment of the present disclosure, FIG. 7 is a cross-sectional view of the structure of the pixel zone along the line AA shown in FIG. 6. Combined shown in FIGS. 6 and 7, an array substrate 12 includes a substrate base material 121 and eleven layer structures sequentially formed on the substrate base material 121: a light-shading metal layer $M_0$, a buffer layer 122, a polycrystalline semiconductor 123, an insulating layer (i.e. Gate Insulation Layer) 124, a first metal layer $M_1$, a dielectric isolation layer (i.e. Interlayer dielectric isolation) 125, a second metal layer $M_2$, a flat passivation layer 126, a common electrode 127, a PV (Passivation) layer 128 and a pixel electrode 129. The polycrystalline semiconductor 123, the first metal layer $M_1$ of the first zone $Z_1$, the second metal layer $M_2$ of the third zone $Z_3$ and the fourth zone $Z_4$, the insulating layer 124 sandwiched between each other, the thin film transistor T of the array substrate 12 formed by the dielectric isolation layer 125 and other connection between the layers structure can be found in the prior art, it is not here to be mentioned here.

The first metal layer $M_1$ includes a spaced first zone $Z_1$ and a spaced second zone $Z_2$, the first metal layer $M_1$ of the first zone $Z_1$ is a gate electrode of the thin film transistor T; the second metal layer $M_2$ includes a spaced third zone $Z_3$ and a spaced zone $Z_4$, the second metal layer $M_2$ of the third zone $Z_3$ and the fourth zone $Z_4$ is a source electrode and a drain electrode of the thin film transistor T; the light-shading metal layer $M_0$ is under the first zone $Z_1$. In view of the gate electrode of the thin film transistor T is on the polycrystalline semiconductor layer 123, the pixel zone P of the present embodiment can be regarded as a top-gate type pixel design.

In the present embodiment, a first contact hole $O_1$ is formed by the dielectric isolation layer 125, and the first metal layer $M_1$ of the second zone $Z_2$ is connected with the second metal layer $M_2$ of the fourth zone $Z_4$ by the first contact hole $O_1$ to receive the gray scale voltage from the second metal layer $M_2$ of the fourth zone $Z_4$; the polycrystalline semiconductor layer 123 is connected with the conductive metal layer of the array substrate 12 to receive the voltage of the conductive metal layer; the polycrystalline semiconductor layer 123 and the first metal layer $M_1$ of the second zone $Z_2$ insulation overlapping arranged by the sandwiched insulating layer 124 to form a MIS storage capacitor $C_{st}$ of the array substrate 12. That is, the first metal layer $M_1$ of the second zone $Z_2$ of the present embodiment forms the metal layer 41 of the MIS storage capacitor $C_{st}$ shown in FIG. 4, and the insulating layer 124 forms the insulating layer 43 shown in FIG. 4.

Further, the conductive metal layer connected with the polycrystalline semiconductor layer 123 can be the common electrode 127, the common electrode 127 is across the active area (AA) of the array substrate 12 and is connected with the polycrystalline semiconductor layer 123 in the periphery of the active area.

Figure 8:
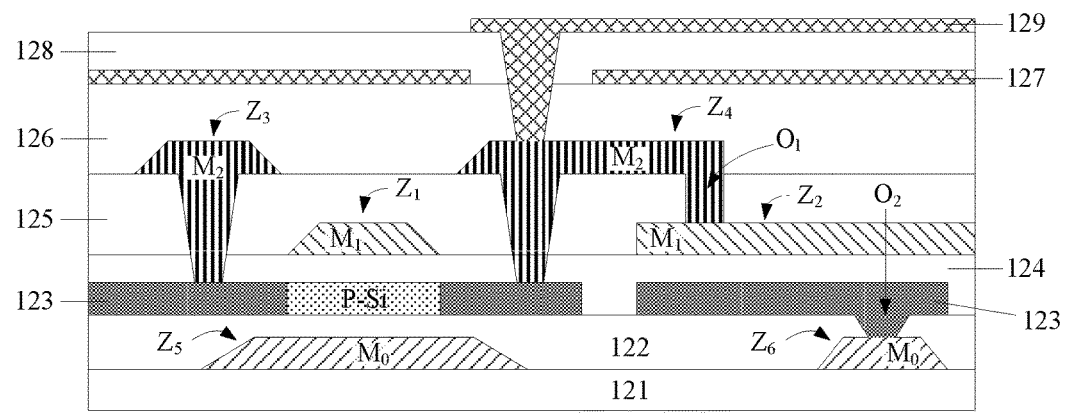
FIG. 8 is a cross-sectional view of the pixel zone structure of the second embodiment of the present disclosure.

Certainly, the conductive metal layer also can be the spaced light-shading metal layer of the light-shading metal layer shown in FIG. 7, refer to FIG. 8, a cross-sectional view of the pixel zone structure of the second embodiment of the present disclosure. For ease of descript the difference of the above embodiment, mark the same structural elements to the same reference numerals. As shown in FIG. 8, the light-shading metal layer $M_0$ includes a spaced fifth zone $Z_5$ and a spaced sixth zone $Z_6$, the fifth zone $Z_5$ is under the first zone $Z_1$, the sixth zone $Z_6$ is under the second zone $Z_2$; a second contact hole $O_2$ is formed by the buffer layer 122, and the polycrystalline semiconductor layer 123 is connected with the light-shading metal layer $M_0$ of the sixth zone $Z_6$ by the second contact hole $O_2$, and the light-shading metal layer $M_0$ of the sixth zone $Z_6$ is across the active area of the array substrate 12 and is connected with the common electrode 127 in the periphery of the active area to receive the voltage.

In the full-text description of the present disclosure embodiment, the polycrystalline semiconductor layer 123 corresponding to the thin film transistor T zone includes a P—Si without heavily doped treatment, i.e. the polycrystalline semiconductor layer 123 of the present disclosure embodiment includes two spaced zone, one includes the P—Si without heavily doped treatment, another one includes the P—Si after heavily doped, the polycrystalline semiconductor layer 123 and the first metal layer $M_1$ of the second zone $Z_2$ of the another one and the insulating layer 124 between the two are form the MIS storage capacitor $C_{st}$ of the array substrate 12.

Figure 9:
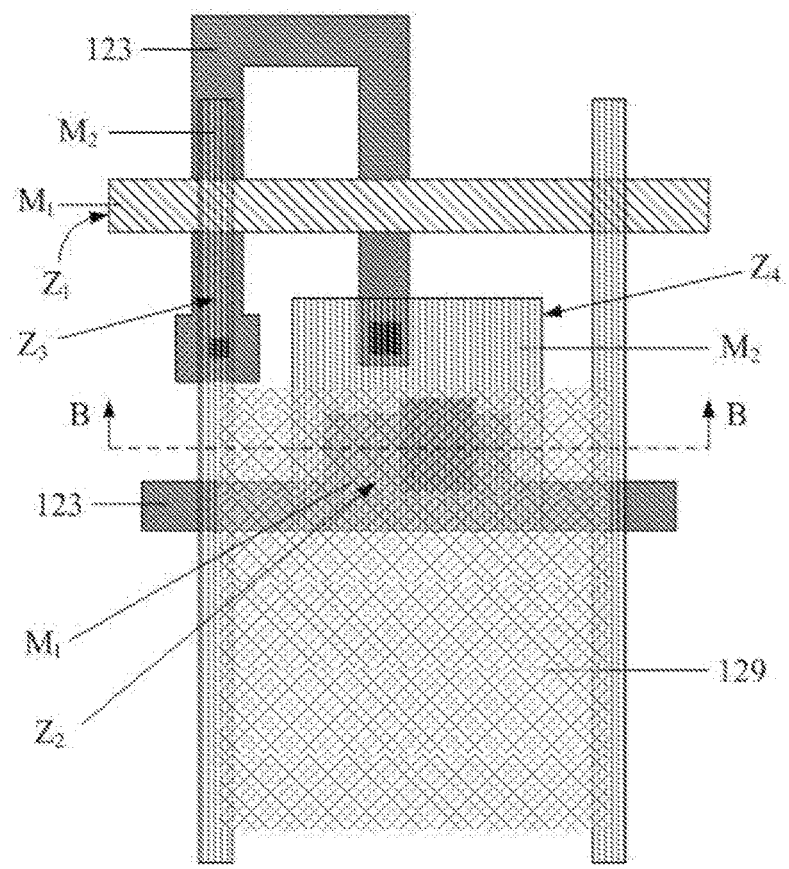
FIG. 9 is a cross-sectional view of the pixel zone structure of the third embodiment of the present disclosure.
Figure 10:
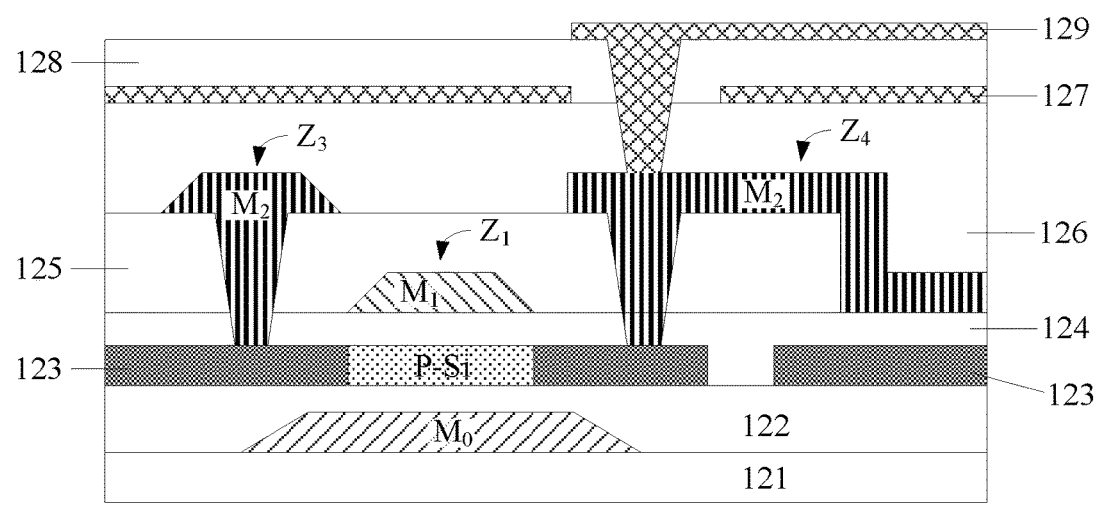
FIG. 10 is a cross-sectional view of the structure of the pixel zone along the line BB shown in FIG. 9.

FIG. 9 is a cross-sectional view of the pixel zone structure of the third embodiment of the present disclosure, and FIG. 10 is a cross-sectional view of the structure of the pixel zone along the line BB shown in FIG. 9. For ease of descript the difference of the above embodiment, mark the same structural elements to the same reference numerals. Combined FIG. 9 and FIG. 10, the difference based on the description of the embodiment in FIG. 6 to FIG. 8 is the present embodiment is not set up a first metal layer $M_1$ of the second zone $Z_2$ but arranges part of the second metal layer $M_2$ of the fourth zone $Z_4$ on the insulating layer 124 directly to form a MIS storage capacitor $C_{st}$ in the polycrystalline semiconductor layer 123, the second metal layer $M_2$ of the fourth zone $Z_4$ and the insulating layer 124 between the two without to form a first contact hole $O_1$ on the dielectric isolation layer 125.

In summary, the object of the present disclosure embodiment is design the polycrystalline semiconductor layer, the first metal layer and the insulating between the two or the polycrystalline semiconductor layer, the second metal layer and the insulating layer between the two to form the MIS storage capacitor. When one side of the first metal layer or the second metal layer is receiving the negative gray scale voltage, a P—Si in the polycrystalline semiconductor layer will gather to form a cavity, when receiving the positive gray scale voltage, a blocking layer will be formed on the P—Si to reduce the capacity of the MIS storage capacitor, i.e., reduce the difference of the capacity when the MIS storage capacitor receiving the positive and negative gray scale voltage to improve the flicker phenomenon and to ensure the display effect.

Figure 11:
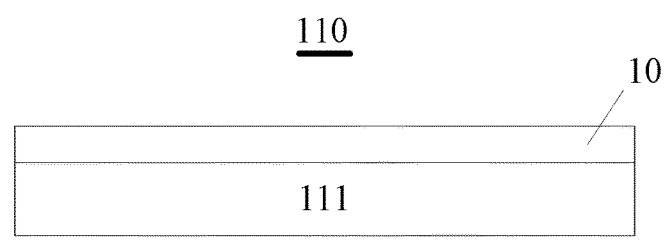
FIG. 11 is a cross-sectional view of the liquid crystal display device structure of the present disclosure.

The present disclosure embodiment further provides a liquid crystal display device 110 shown in FIG. 11, the liquid crystal display device 110 includes the above liquid crystal display panel 10 and a light source module 111 for providing light to the liquid crystal display panel 10, the liquid crystal display panel 10 can uses FFS (Fringe Field Switching) art. Because of the liquid crystal display device 110 further has the design of the above array substrate 12, the liquid crystal display device 110 has the advantageous effects also.

It should be understood, the above are only embodiments of the present disclosure is not patented and therefore limit the scope of the present disclosure, any use made of the present disclosure specification and drawings equivalent structures or equivalent process transformation, either directly or indirectly related technologies used in other areas are included in the patent empathy scope of the disclosure.

What is claimed is:

1. An array substrate, wherein the array substrate comprises a substrate base material and a first metal layer, an insulating layer, a polycrystalline semiconductor layer and a second metal layer formed on the substrate base material, the first metal layer comprises a spaced first zone and a spaced second zone, the first metal layer of the first zone is a gate electrode of a TFT of the array substrate, the second metal layer comprises a spaced third zone and a spaced fourth zone, the second metal layer of the third zone and the second metal layer of the fourth zone are respectively a source electrode and a drain electrode of the TFT, wherein the polycrystalline semiconductor layer and the first metal layer of the second zone are insulating overlapped by the sandwiched insulating layer to form a MIS storage capacitor of the array substrate;

wherein the array substrate further comprises a dielectric isolation layer formed between the first metal layer and the second metal layer, the polycrystalline semiconductor layer is connected with a conductive metal layer of the array substrate, a first contact hole is formed by the dielectric isolation layer, the first metal layer of the second zone is connected with the second metal layer of the fourth zone by the first contact hole, thus the MIS storage capacitor is formed in the polycrystalline semiconductor layer, the first metal layer of the second zone and the insulating layer located between the two.

2. The array substrate according to claim 1, wherein the gate electrode of the TFT is on the polycrystalline semiconductor layer, the array substrate further comprises a light-shading metal layer formed on the substrate base material and a buffer layer arranged between the light-shading metal layer and the polycrystalline semiconductor layer, the light-shading metal layer is under the first zone.

3. The array substrate according to claim 2, wherein the light-shading metal layer comprises a spaced fifth zone and a spaced sixth zone, the fifth zone is under the first zone, the conductive metal layer of the array substrate comprises the light-shading metal layer of the sixth zone, a second contact hole is formed by the buffer layer, the polycrystalline semiconductor layer is connected with the light-shading metal layer of the sixth zone by the second contact hole.

4. The array substrate according to claim 3, wherein the light-shading metal layer of the sixth zone is across an active area of the array substrate, the array substrate further comprises a common electrode arranged on the substrate base material, the light-shading metal layer of the sixth zone is connected with the common electrode at periphery of the active area.

5. The array substrate according to claim 1, wherein the polycrystalline semiconductor layer comprises a heavily doped polysilicon layer.

6. The array substrate according to claim 5, wherein the heavily doped polysilicon layer is heavily doped with Be.

7. A liquid crystal display panel comprising the array substrate as claimed in claim 1.

8. A liquid crystal display device, wherein the liquid crystal display device comprises a liquid crystal display panel and a light source module providing light to the liquid crystal display panel, wherein the liquid crystal display panel is the liquid crystal display panel of claim 7.

* * * * *